United States Patent
Hawkes et al.

(10) Patent No.: US 7,623,656 B2
(45) Date of Patent: Nov. 24, 2009

(54) STREAM CIPHER ENCRYPTION AND MESSAGE AUTHENTICATION

(75) Inventors: Phillip Hawkes, Burwood (AU); Michael Paddon, Kellyville (AU); Gregory Gordon Rose, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 731 days.

(21) Appl. No.: 11/061,708

(22) Filed: Feb. 17, 2005

(65) Prior Publication Data
US 2005/0213752 A1 Sep. 29, 2005

Related U.S. Application Data

(60) Provisional application No. 60/545,396, filed on Feb. 17, 2004, provisional application No. 60/546,712, filed on Feb. 20, 2004.

(51) Int. Cl.
*H04L 9/00* (2006.01)
*H04K 1/00* (2006.01)
(52) U.S. Cl. .............................. 380/42; 380/43; 380/255
(58) Field of Classification Search .................. 380/43, 380/255, 42
See application file for complete search history.

(56) References Cited

OTHER PUBLICATIONS http://www.tcpipguide.com/free/t_BitMaskingSettingClearingandInvertingUsingBooleanL.htm, pp. 1, 2, 3, printed out in year 2008.*
Festa, Cnet News, Group prepares MPEG-4 encryption, year 2003.*
Bellare and Namprepre, Authenticated Encryption, Dec. 7, 2000, UCSD.*
Vuckovac, MAG Cipher Design Notes, as printed out in year 2008.*
Adaptive chosen-ciphertext attack, Wikipedia, printed out in year 2008.*
AEAD block cipher modes of operation, Wikipedia, printed out in year 2008.*
Authenticated encryption, Wikipedia, printed out in year 2008.*
Chosen plaintext attack, Wikipedia, printed out in year 2008.*
eSTREAM, Wikipedia, printed out in year 2008.*
EAX mode, Wikipedia, printed out in year 2008.*
Initialization vector, Wikipedia, printed out in year 2008.*
Linear feedback shift register, Wikipedia, printed out in year 2008.*
Shrinking generator, Wikipedia, printed out in year 2008.*

(Continued)

*Primary Examiner*—David Y Jung
(74) *Attorney, Agent, or Firm*—Jae-Hee Choi; Won Tae C. Kim (57) ABSTRACT

Stream cipher encryption and message authentication. Stream cipher encryption is performed by generating a keystream at the transmitting end from a state value, applying the keystream to plaintext to generate an encrypted message block having at least a portion of the plaintext converted to ciphertext, and updating the state value as a function of said at least a portion of the plaintext. Stream cipher decryption is performed by generating a keystream at the receiving end from the same state value, applying the keystream to the encrypted message block to convert the ciphertext to plaintext, and updating the state value as a function of the plaintext. Message authentication techniques are also described.

42 Claims, 6 Drawing Sheets

OTHER PUBLICATIONS

Malleability, Wikipedia, printed out in year 2008.*
Mask, Wikipedia, printed out in year 2008.*
Message authenication code, Wikipedia, printed out in year 2008.*
NSLFSR, Wikipedia, printed out in year 2008.*
Plaintext, Wikipedia, printed out in year 2008.*
Shift register, Wikipedia, printed out in year 2008.*
Design of keystream generator Chi-Kwong Chan; Cheng, L.M.; Electronics Letters vol. 34, Issue 12, Jun. 11, 1998 pp. 1206-1207.*
Clock-controlled chaotic keystream generators Sang Tao; Wang Ruli; Yan Yixun; Electronics Letters vol. 34, Issue 20, Oct. 1, 1998 pp. 1932-1934.*
Linear models for keystream generators Golic, J.D.; Computers, IEEE Transactions on vol. 45, Issue 1, Jan. 1996 pp. 41-49.*

* cited by examiner

STREAM CIPHER ENCRYPTION AND MESSAGE AUTHENTICATION

CROSS REFERENCE

This present application claims priority to Provisional Application No. 60/545,396 entitled "STREAM CIPHER ENCRYPTION AND AUTHENTICATION OF A MESSAGE," filed Feb. 17, 2004, and Provisional Application No. 60/546,712 entitled "A FAST STREAM CIPHER WITH SIMULTANEOUS MESSAGE," filed Feb. 20, 2004. These applications are expressly incorporated herein by reference as though fully set forth in full.

BACKGROUND

1. Field

The present disclosure relates generally to security in data processing systems, and more particularly, to encryption and authentication techniques in data processing systems.

2. Background

In a number of diverse fields, such as, e.g., electronic commerce, communications, and broadcasting, security is a major concern. Security measures contribute to accountability, fairness, accuracy, confidentiality, operability, and other criteria that are desired of data processing systems. Cryptographic methods that provide such security are usually categorized according to two purposes: encryption and authentication. Encryption is used to render a message unreadable to unauthorized parties. Authentication is used to verify the identity of the sender and to verify that the message has not been altered in transit.

Traditional cryptographic methods have required that the entire message be encrypted. In many situations, this does not present a problem. However, some protocols require that part of the message be transmitted in an unencrypted form. A common example is a packet header used for addressing purposes on the Internet. In these situations, it is desirable to authenticate both the encrypted and unencrypted portions of the message together to reduce the computational load and increase the speed of the authentication process.

In the past, protocol designers have devised several approaches for authenticating a partially encrypted message. "Authenticated Encryption with Associated Data" (AEAD) is just one example of such an approach, and is well known in the art. AEAD provides a block cipher methodology for encryption and authentication. However, block ciphers are less efficient and less convenient than stream ciphers. Accordingly, there is a need in the art for a stream cipher that provides both secure encryption and authentication of partially encrypted messages.

SUMMARY

An encryption module is disclosed. The encryption module includes a storage medium configured to store a state value, and a processor. The processor is configured to generate a keystream from the state value, and apply the keystream to plaintext to generate an encrypted message block having at least a portion of the plaintext converted to ciphertext. The processor is further configured to update the state value in the storage medium as a function of said at least a portion of the plaintext.

A decryption module is disclosed. The decryption module includes a storage medium configured to store a state value, and a processor. The processor is configured to generate a keystream from the state value, and apply the keystream to an encrypted message block to convert ciphertext to plaintext. The processor is further configured to update the state value in the storage medium as a function of the plaintext.

A method of encryption is disclosed. The method includes generating a keystream from a state value, applying the keystream to plaintext to generate an encrypted message block having at least a portion of the plaintext converted to ciphertext, and updating the state value in the storage medium as a function of said at least a portion of the plaintext.

A method of decryption is disclosed. The method includes generating a keystream from the state value, applying the keystream to an encrypted message block to convert ciphertext to plaintext, and updating the state value in the storage medium as a function of the plaintext.

Computer readable media embodying a program of instructions executable by a processor to perform a method of encryption is disclosed. The method includes generating a keystream from a state value, applying the keystream to plaintext to generate an encrypted message block having at least a portion of the plaintext converted to ciphertext, and updating the state value in the storage medium as a function of said at least a portion of the plaintext.

Computer readable media embodying a program of instructions executable by a processor to perform a method of decryption is disclosed. The method includes generating a keystream from the state value, applying the keystream to an encrypted message block to convert ciphertext to plaintext, and updating the state value in the storage medium as a function of the plaintext.

Another aspect of the encryption module is disclosed. The encryption module includes means for generating a keystream from a state value, means for applying the keystream to plaintext to generate an encrypted message block having at least a portion of the plaintext converted to ciphertext, and means for updating the state value in the storage medium as a function of said at least a portion of the plaintext.

Another aspect of the decryption module is disclosed. The decryption module includes means for generating a keystream from the state value, means for applying the keystream to an encrypted message block to convert ciphertext to plaintext, and means for updating the state value in the storage medium as a function of the plaintext.

DETAILED DESCRIPTION

The detailed description set forth below in connection with the appended drawings is intended as a description of various embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well known structures and components are shown in block diagram form in order to avoid obscuring the concepts of the present invention.

Figure 1:
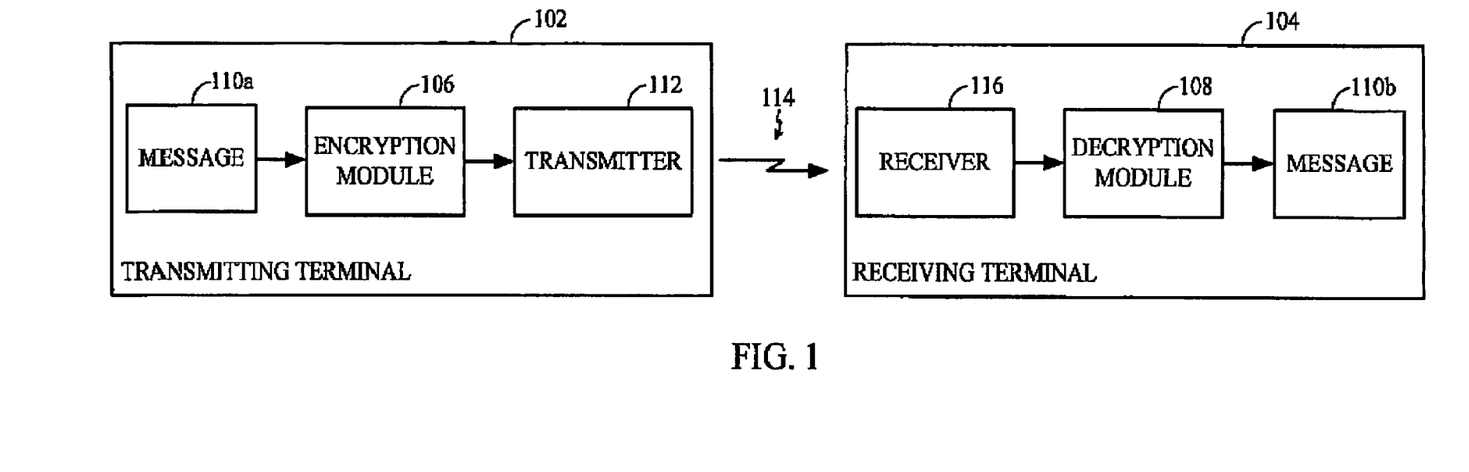
FIG. 1 is a conceptual block diagram illustrating an example of a transmitting and receiving terminal in a communications system.

FIG. 1 is a conceptual block diagram illustrating an example of a transmitting and receiving terminal in a communications system. The transmitting and receiving terminals 102, 104 may be devices capable of supporting communications including telephones, computers, laptops, personal digital assistants (PDA), audio broadcast and receiving equipment, video conferencing equipment, or the like. In one embodiment, the transmitting and receiving terminals 102, 104 are implemented with wireless Code Division Multiple Access (CDMA) capability, but may be implemented with any suitable communications technology. CDMA is a modulation and multiple access scheme based on spread-spectrum communications and is well known in the art.

The transmitting terminal 102 is shown with an encryption module 106 and the receiving terminal 104 is shown with a decryption module 108. The encryption module 106 may be used to partially encrypt a message from a message 110a. The message may be generated by a user interface on the transmitting terminal, a remote terminal, or any other suitable message source. A transmitter 112 may be used to send the partially encrypted message across a communications channel 114. The communications channel 114 may be a wired or wireless network, including by way of example, the Internet, a wireless CDMA network, or any other suitable communications channel. A receiver 116 at the other end of the communications channel 114 may be used to receive the partially encrypted message and provide it to the decryption module 108. The decryption module 108 may be used to recover the original message 110b. Although not shown, various signal processing functions may be performed in both the transmitting and receiving terminals 102, 104 such as convolutional encoding, interleaving, digital modulation, and spread spectrum processing.

The encryption and decryption modules 106, 108 may be implemented as stand-alone components, or distributed across one or more components within their respective terminals. The encryption and decryption modules 106, 108 may be implemented as hardware, firmware, software, or any combination thereof. For the purposes of explanation, the encryption and decryption modules 106, 108 will be described in terms of their functionality. The manner in which they are implemented will depend on the particular application and the design constraints imposed on the overall system. Those skilled in the art will recognize the interchangeability of hardware, firmware, and software configurations under these circumstances, and how best to implement the described functionality for each particular application.

In most applications, each party to a communication transmits as well as receives. Each terminal would therefore require both an encryption and decryption module in these applications. In these applications, the encryption and decryption modules may be separate components, integrated into a single component, or distributed across multiple components in their respective terminals. In the detailed description to follow, the transmitting and receiving terminals 102, 104 will be described with an encryption module 106 at one end of the communications channel 114 and a decryption module 108 at the other. Those skilled in the art will readily recognize how to extend the concepts described herein to two-way communications.

The ability to read the partially encrypted message at the receiving terminal 104 depends on a shared secret key known to the encryption and decryption modules 106, 108. The secret key is initially set up as a configuration function. That is, the configuration manager or the network manager is responsible for distributing secret keys to be loaded into memory on the various transmitting and receiving terminals 102, 104. This can be done manually or by using some form of secure key distribution scheme.

The partially encrypted message may be authenticated with a message authentication tag. The message authentication tag may be computed as a function of both the message content and the secret key. The message authentication tag is sent with the partially encrypted message over the communications channel 114 to the receiving terminal 104. The decryption module 108 re-computes the message authentication tag from the partially encrypted message and authenticates the message if the re-computed message authentication tag agrees with the transmitted one.

Figure 2:
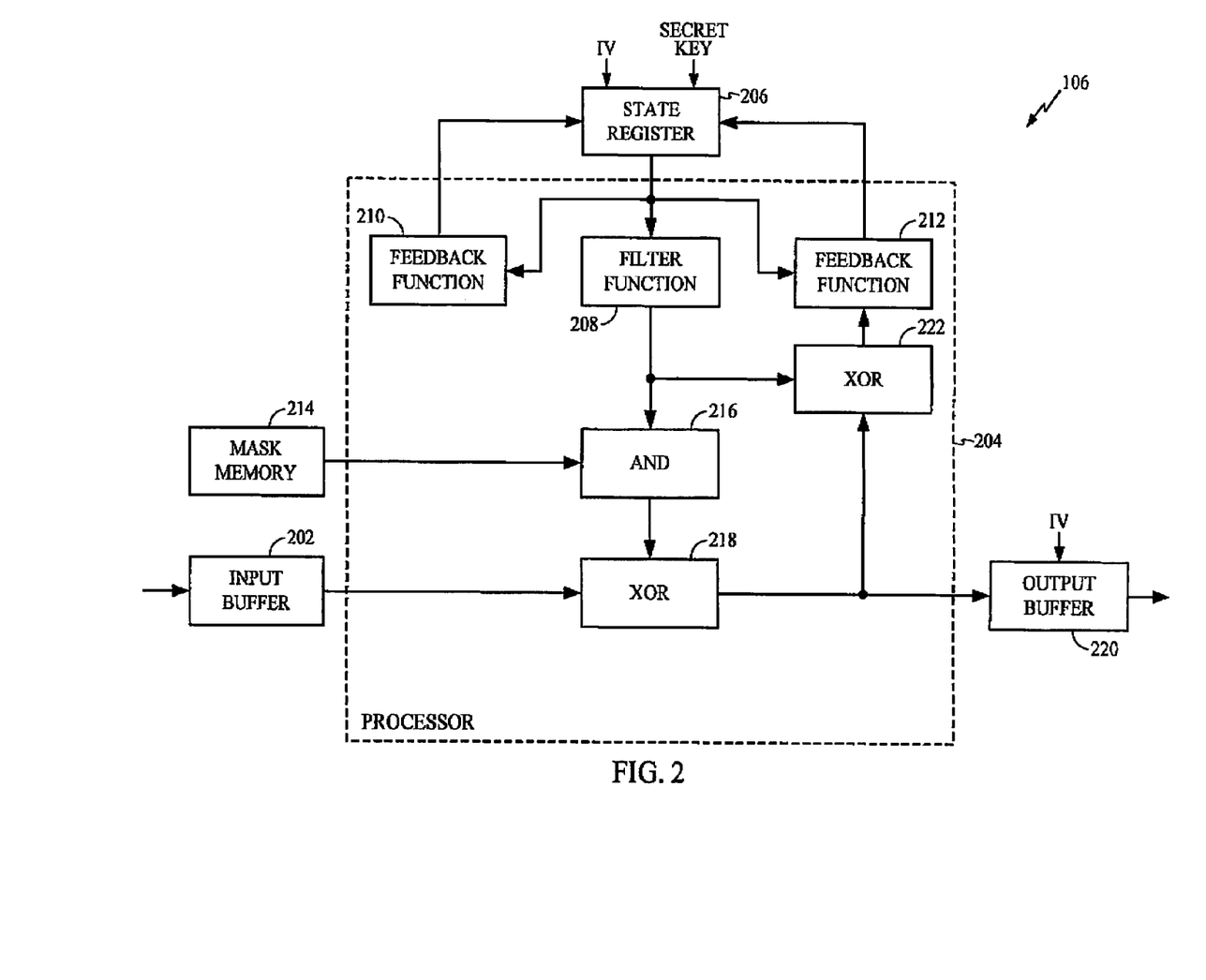
FIG. 2 is a functional block diagram illustrating an example of an encryption module.

FIG. 2 is a functional block diagram illustrating an example of an encryption module. The encryption module 106 may be used to process multiple blocks of the message. An input buffer 202 may be used to release the message blocks to a processor 204 in a serial fashion. Each block has a fixed length in terms of bits, and in this example, each block contains 32-bits or one word. In other embodiments, the length of the block may be any suitable number of bits depending on the specific application and the overall design constraints imposed on the system. Each message block, once processed, may be categorized as either a plaintext message block or an encrypted message block. A "plaintext message block" contains only plaintext, whereas an "encrypted message block" contains one or more bits of ciphertext.

The encryption process begins with a message being loaded into the input buffer 202. Once this occurs, the secret key is used to initialize a state register 206. The state register 206 may be any suitable type of storage medium. For added security, a public Initial Value (IV) generated by the encryption module 106 may be used in conjunction with the secret key to initialize the state register 206. Unlike the secret key, which remains relatively fixed over time, the IV may be changed periodically, typically with each new message received by the input buffer 202. The IV may be sent with the partially encrypted message over the communications channel so that the decryption module in the receiving terminal can likewise initialize its state register. The state register 206 holds a state value that may be any suitable bit length depending on the specific security requirements of the system. Generally speaking, the longer the state value, the more cryptographically secure the transmission will be.

The processor 204 may use various cryptographic functions to process the serial stream of message blocks released from the input buffer 202. In one embodiment of the processor 204, a filter function 208 and two feedback functions 210, 212 are used. The filter function 208 may be used to compute a keystream from the current state value. The keystream length is equal to the length of the message block, and in this case, is 32-bits. The filter function 208 may be any suitable cryptographic function that meets the specific security requirements of the system. In at least one embodiment, the filter function 208 is efficient and highly non-linear. Those skilled in the art will be readily able to derive the appropriate filter function 208 for any particular security application.

A block of the message may be released from the input buffer 202 for processing by the keystream. The keystream may be masked if a portion of the message block is to be transmitted as plaintext. In particular, the entire keystream will be masked if a plaintext message block is to be generated, and no more than a portion of the keystream will be masked if an encrypted message block is to be generated. Since the portion of each message block that will be converted to ciphertext is network dependent, and therefore known beforehand by both the transmitting and receiving terminals, the various masks may be preprogrammed into memory 214. The keystream may be masked using, by way of example, a bit-wise AND operation 216, before being applied to the message block. The masked keystream may be applied to the message block using an exclusive-OR (XOR) operation 218, or by any other suitable means. The result may be stored in an output buffer 220 before it is transmitted to the receiving terminal.

The first and second feedback functions 210, 212 are used to update the state value in the state register 206 before the next message block in the input buffer 202 is processed. The first feedback function 210 is applied to the state value and fed back into the state register 206. The first feedback function 210 is generally a linear function, but may be non-linear. A linear feedback function may provide efficient processing without compromising security if the filter function 208 is non-linear. Those skilled in the art will readily be able to derive an appropriate feedback function 210 for any particular security application.

The second feedback function 212 is dependent on the partially encrypted message. In the embodiment shown, the second feedback function 212 is also dependent on the current state value in the state register 206. The second feedback function 212 may be any function that meets the specified security requirements of the system. For increased security, the second filter function 212 should be efficient and highly non-linear, but does not have to be. The actual implementation of the second feedback function 212 will be readily apparent to those skilled in the art based on the particular security application.

In at least one embodiment of the encryption module 206, the input to the second feedback function 212 is based on the content of the processed message block. In particular, the input includes (1) ciphertext generated from the plaintext portion of the processed message block, and (2) the plaintext portion of the original message used to generate the ciphertext in the processed message block. This input may be generated in a variety of ways. By way of example, the unmasked keystream from the filter function 208 may be applied to the processed message block using, by way of example, an XOR operation 222 as shown in FIG. 2. Alternatively, a bit-wise complimentary mask may be applied to the message block released from the input buffer 202 using a bit-wise AND operation. Either way, the output of the second feedback function 212 is fed back into the state register 206 to update the state value before the next message block from the input buffer 202 is processed.

The encryption process continues on a block-by-block basis until the input buffer 202 is empty. In the event that the contents of the last message block released from the input buffer 202 is less than a full block in length, various procedures may be used to complete the encryption process. One such procedure entails setting to zero the bit positions in the mask that correspond to the bits in the message block without data. The modified mask is then applied to the keystream using, by way of example, the AND operation 216. The resulting masked keystream may then be truncated to the length of the text in the message block before being applied thereto using the XOR operation 218, or any other suitable operation. The result is then placed in the output buffer 220 to complete the encryption process.

The input to the second feedback function 212 is formed by expanding the contents of the processed message block with zero value padding bits. The result may then be XORed 222 with the unmasked keystream to produce the input to the second feedback function 212 as shown in FIG. 2. Alternatively, a bit-wise complimentary mask may be generated from the modified mask and applied to the message block using a bit-wise AND operation. The result of this operation may then be input to the second feedback function 212.

Once the entire message has been partially encrypted, a message authentication tag may be generated. In at least one embodiment of the encryption module 206, the message authentication tag is dependent on the bit length of the partially encrypted message. In particular, the first and second feedback functions 210, 212 are used to update the state value in the state register 206 with the length of the partially encrypted message being input to the second feedback function 212. The length may be represented by a constant plus the number of pad bits required to process the last message block. Since the input buffer 202 is empty, the keystream generated by the filter function 208 is effectively fed back to the input of the second feedback function 212 through the XOR function 222.

The state value in the state register 206 may then be updated a suitable number of times. Generally speaking, the trustworthiness of the message authentication tag increases with more updates. Each update is accomplished by feeding back the state value though the first feedback function 210, and feeding back the keystream to the second feedback function 212. Once the state value is updated a given number of times, the resulting keystream from the filter function 208 is effectively coupled through the XOR function 218 to the output buffer 220. Increased security may be achieved by additional updates of the state value in the state register 206, with the multiple keysteams being provided to the output buffer 212. A concatenation of the one or more keystreams in the output buffer 212 may be used as the message authentication tag.

Figure 3:
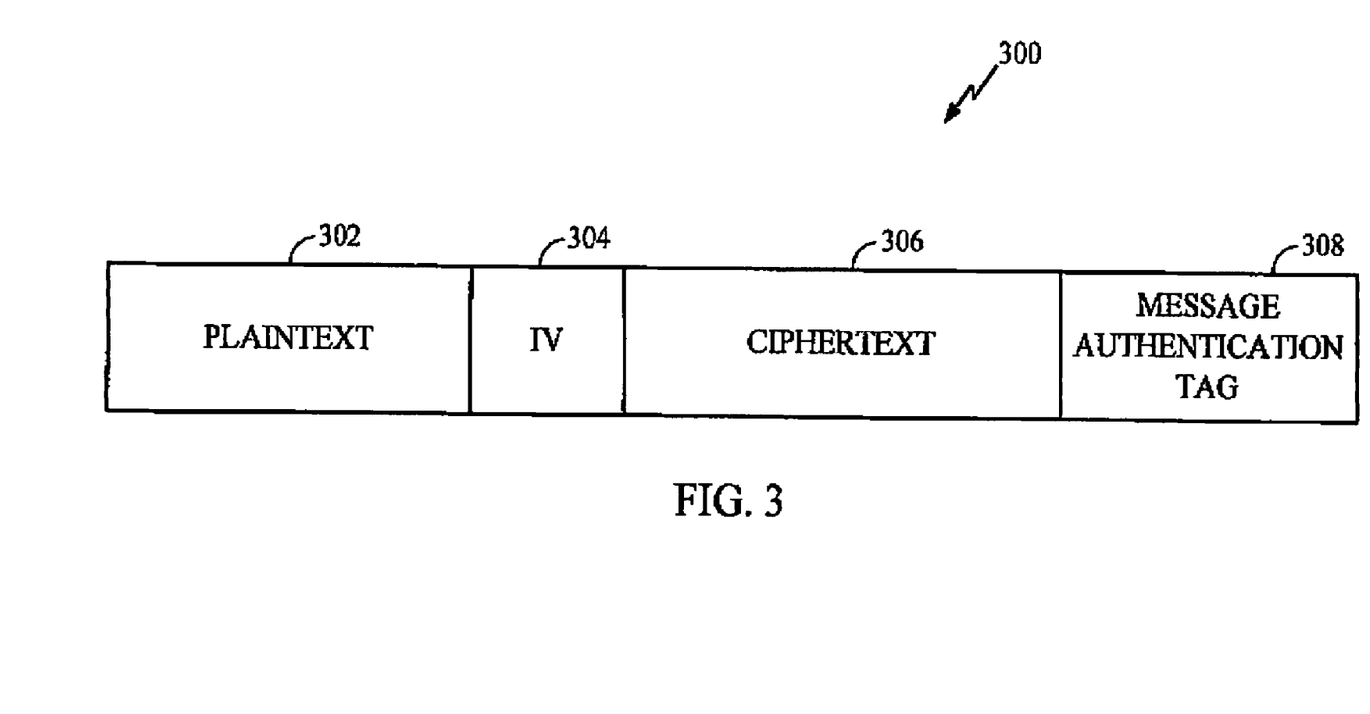
FIG. 3 is graphical representation illustrating an example of a transmission block.

The output buffer 212 may be used to assemble the processed message blocks, the message authentication tag, and the IV into a transmission block. FIG. 3 is a graphical representation illustrating an example of a transmission block. The transmission block 300 may be a packet, a frame, or any other suitable format dictated by the communications protocol.

In the example shown in FIG. 3, the plaintext 302 serves as the preamble or header of the packet 300. This might be the case where the communications channel is a packet-based network, and the plaintext is the address of the receiving terminal. The IV 304 may be inserted between the plaintext 302 and the ciphertext 306, and message authentication tag 308 may be provided at the end of the packet. Alternatively, the plaintext, IV, ciphertext, and authentication tag may be formatted in any order, and in some instances the plaintext and ciphertext may be interspersed.

Figure 4:
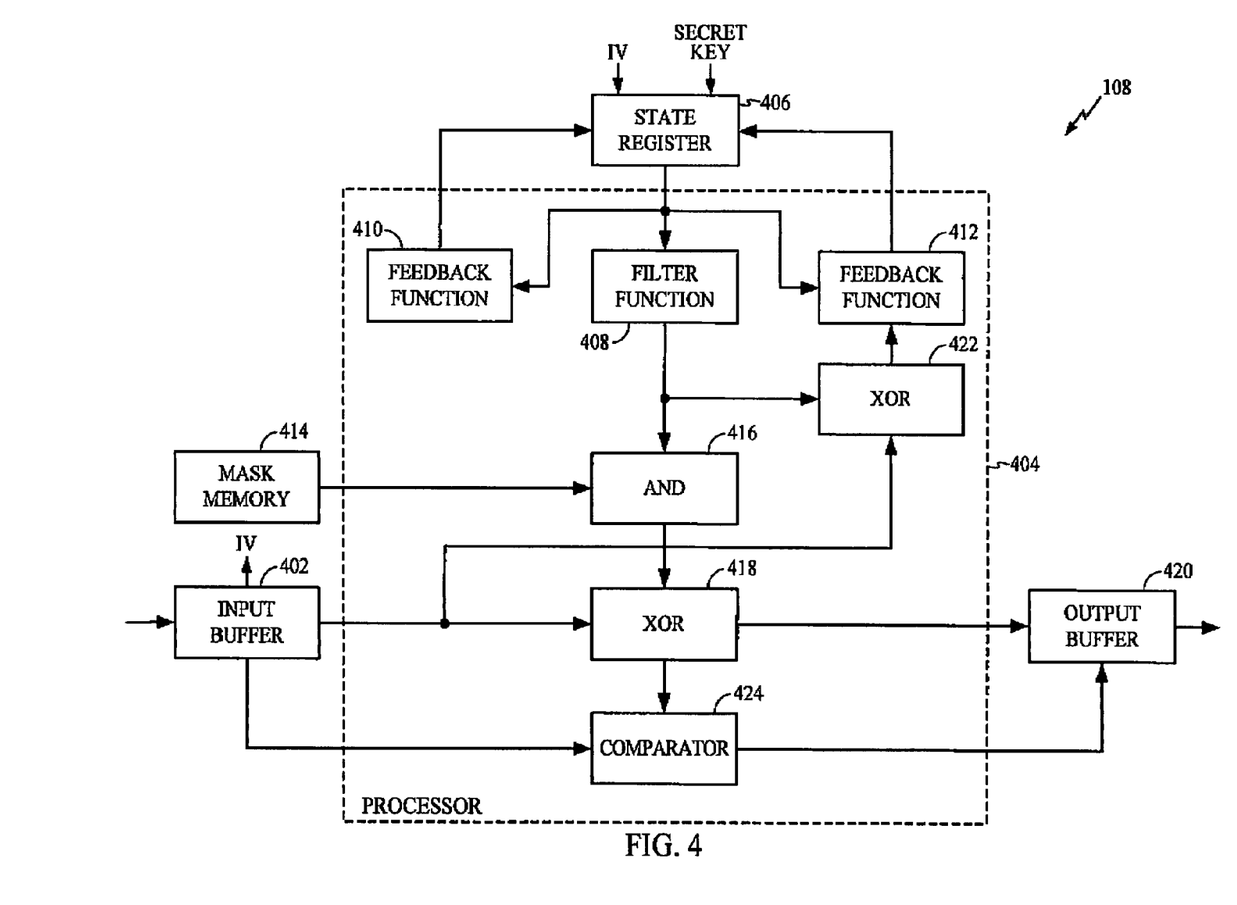
FIG. 4 is a functional block diagram illustrating an example of a decryption module.

FIG. 4 is a functional block diagram illustrating an example of a decryption module. The decryption module 108 may be used to process the transmission block to recover the original message. The decryption process begins with the transmission block being loaded into an input buffer 402. Once this occurs, the IV from the transmission block is used in conjunction with the secret key to initialize a state register 406.

A processor 404 may employ the same cryptographic functions as the encryption module to decrypt a serial stream of processed message blocks from the input buffer 402. The cryptographic functions include a filter function 408 and two feedback functions 410, 412. The filter function 408 may be used to compute a keystream from the current state value. The keystream may be masked using an AND operation 416, or any other suitable function. Since the portion of each message block that will be converted to ciphertext is network dependent, the various masks are known by both the transmitting and receiving terminals. Accordingly, the masks do not need to be sent over the communications channel to the receiving terminal. Instead, the masks may be preprogrammed into memory 414 and accessed when needed to process the partially encrypted message. The masked keystream may be applied to the processed message block released from the input buffer 402 using an XOR operation 418, or by any other suitable means. The resulting decrypted message block may be stored in an output buffer 420 until the message authentication tag can be verified.

The first and second feedback functions 410, 412 are used to update the state value in the state register 406 before the next processed message block is released from the input buffer 402. The feedback functions are the same feedback functions implemented by the encryption module. In particular, the first feedback 410 is applied to the state value and fed back into the state register 406. The second feedback function 412 is dependent on the partially encrypted message and the current state value in the state register 406. The input to the second feedback function 212 includes (1) ciphertext generated from the plaintext portion in the processed message block, and (2) the plaintext portion of the original message used to create the ciphertext in the processed message block. This input may be generated by applying the unmasked keystream from the filter function 408 to the processed message block using, by way of example, an XOR operation 422 as shown in FIG. 4. Alternatively, a bit-wise complimentary mask may be applied to the decrypted message block using a bit-wise AND operation. Either way, the output of the second feedback function 412 is fed back into the state register 406 to update the state value before the next processed message block from the input buffer 402 is decrypted.

In a manner similar to the encryption module, the decryption process continues on a block-by-block basis until the input buffer 402 is empty. In the event that the contents of the last processed message block released from the input buffer 402 is less than a full block in length, the same procedures used in the encryption module may be employed to complete the decryption process. In particular, the bit positions in the mask that correspond to the bits in the processed message block without data are set to zero. The modified mask is then applied to the keystream from the filter function 408 using, by way of example, the AND operation 416. The resulting masked keystream may then be truncated to the length of the text in the processed message block before being applied to the processed message block using an XOR 418 operation, or any other suitable operation. The resultant decrypted message block is then placed in the output buffer 420 to complete the decryption process.

The input to the second feedback function 412 is formed by expanding the contents of the decrypted message block with zero value padding bits. The result may then be XORed 422 with the unmasked keystream to produce the input to the second feedback function 420 as shown in FIG. 4. Alternatively, a bit-wise complimentary mask may be generated from the modified mask and applied to the processed message block using a bit-wise AND operation. Either way, the result is input to the second feedback function 420.

Once the entire message is decrypted, the message authentication tag may be verified. The process of verifying the message authentication tag includes updating the state value in the state register 406 with the first and second feedback functions 410, 412, with the length of the partially encrypted message being input to the second feedback function 412. Since the input buffer 402 is empty, the keystream generated by the filter function 408 is effectively fed back to the input of the second feedback function 420. Following this operation, the state value in the state register 206 is updated the same number of times it was updated in the encryption module using both the first and second feedback function 410, 412. Once the state value is updated the requisite number of times, the resulting keystream from the filter function 408 is provided through the XOR function 418 to the output buffer 420. Depending on the implementation of the encryption module, additional updates of the state value in the state register 406 may be performed to provide multiple keysteams to the output buffer 420. In any event, the expected message authentication tag can be generated by concatenating the one or more keystreams in the output buffer 412. The result may then be compared 424 to the message authentication tag in the transmission block. If the tags match, the decrypted message in the output buffer 420 is released. On the other hand, if the tags do not match, the decrypted message will not be released from the output buffer 420.

Figure 5:
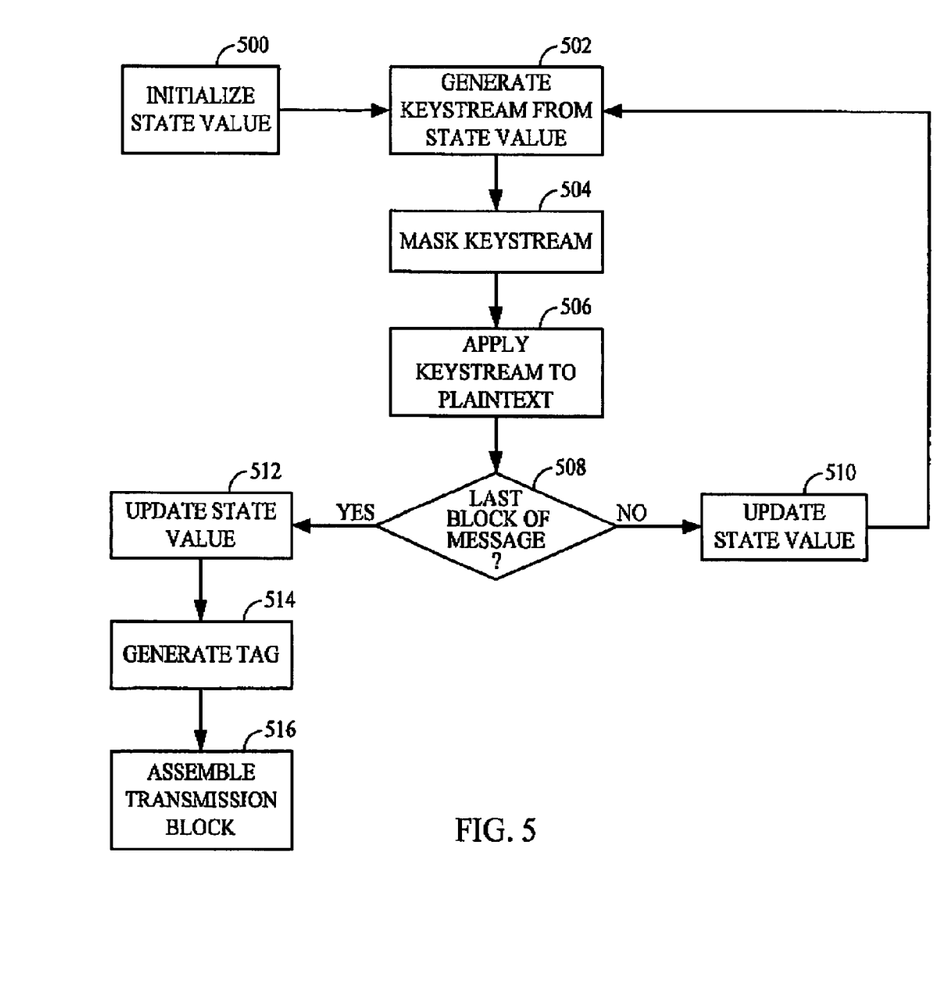
FIG. 5 is a flow chart illustrating the operation of an encryption module.

FIG. 5 is a flow diagram illustrating the operation of an encryption module. In step 500, the state value is initialized using the secret key and the IV. The state value is then used to generate a keystream in step 502. The keystream is masked in step 504. The masked keystream is applied to a message block from the input buffer in step 506, and the encrypted message block loaded into the output buffer. Once this occurs, the encryption module determines in step 508 whether the encrypted message block is the last block of the message. If the encrypted message block is not the last block, then the encryption module updates the state value in step 510 and repeats the process on the next message block in the input buffer. If, on the other hand, the encrypted message block is the last block, then the state value is updated multiple times in step 512 using the length of the message. A message authentication tag is generated in step 514, and the message authentication tag is used to assemble a transmission block in step 516.

Figure 6:
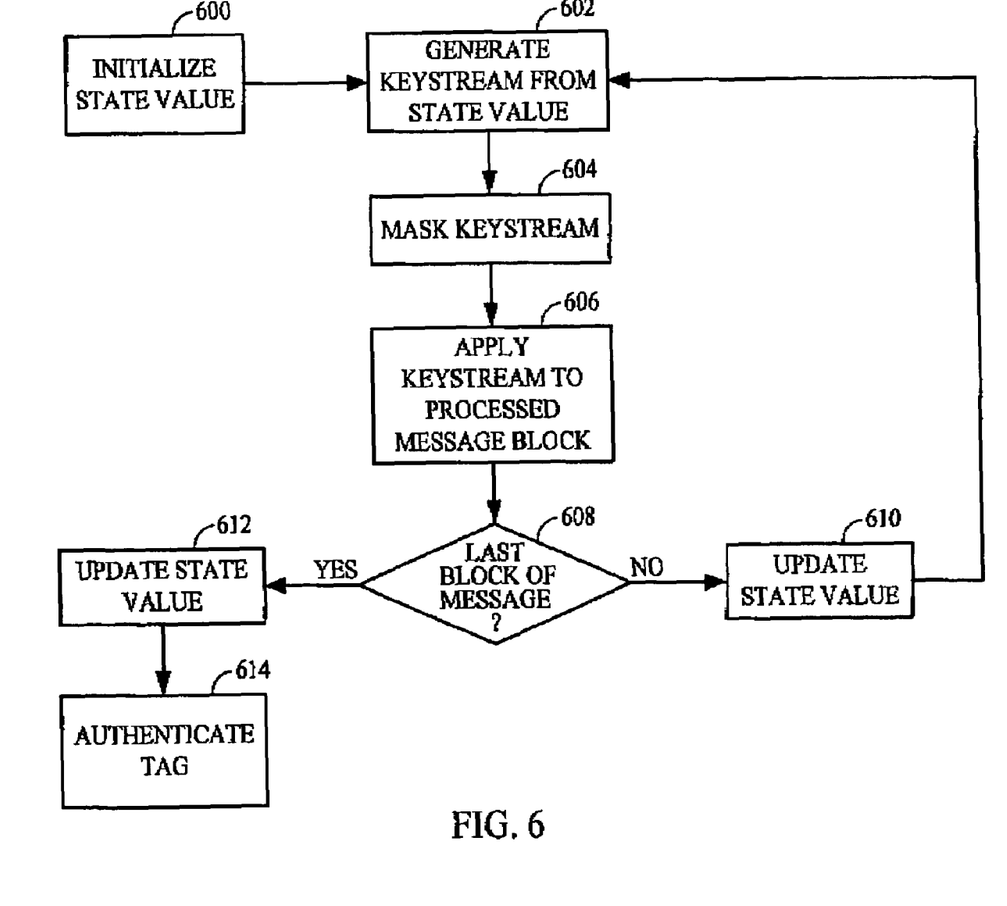
FIG. 6 is a flow chart illustrating the operation of a decryption module.

FIG. 6 is a flow diagram illustrating the operation of a decryption module. In step 600, the state value is initialized using the secret key and the IV. The state value is then used to generate a keystream in step 602. The keystream is masked in step 604. The masked keystream is applied to a processed message block from the input buffer in step 606, and the decrypted message block loaded into the output buffer. Once this occurs, the decryption module determines in step 608 whether the decrypted message block is the last block of the message. If the decrypted message block is not the last block, then the decryption module updates the state value in step 610 and repeats the process on the next processed message block in the input buffer. If, on the other hand, the decrypted message block is the last block, then the state value is updated multiple times in step 612 using the length of the message to generate an expected tag. The transmitted message authentication tag is authenticated in step 614 by comparing it to the expected tag.

Although the flow diagrams describe the operation of the encryption and decryption modules as a sequential process, some of the operations can be performed in parallel or concurrently. In addition, the order of the operations may be rearranged. In some embodiments, certain steps may be omitted, or additional steps may be added depending on the particular application and the overall design constraints.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An encryption module, comprising: a storage medium configured to store a state value; and a processor configured to generate a keystream from the state value, and apply the keystream to plaintext to generate an encrypted message block having at least a portion of the plaintext converted to ciphertext, and wherein the processor is further configured to update the state value in the storage medium as a function of said at least a portion of the plaintext.

2. The encryption module of claim 1 wherein the plaintext includes a second portion, and the encrypted message block includes the ciphertext and the second portion of the plaintext, wherein the processor is further configured to update the state value in the storage medium as a function of ciphertext generated from the second portion of the plaintext.

3. The encryption module of claim 1 wherein the plaintext includes a second portion, and the encrypted message block includes the ciphertext and the second portion of the plaintext, and wherein the processor is further configured to apply a mask to the keystream, the masked keystream preventing the second portion of the plaintext from being converted to ciphertext.

4. The encryption module of claim 1 wherein the processor is further configured to generate a plaintext message block with only plaintext, and update the state value in the storage medium as a function of ciphertext generated from the plaintext in the plaintext message block.

5. The encryption module of claim 4 wherein the processor is further configured to apply a mask to the keystream, the masked keystream preventing the plaintext in the plaintext message block from being converted to ciphertext.

6. The encryption module of claim 5 wherein the processor is further configured to generate a transmission block including one or more plaintext message blocks and one or more encrypted message blocks, and attaching a message authentication tag to the transmission block, the processor being further configured to generate the message authentication tag from the state value in the storage medium at some time after the one or more plaintext message blocks and the one or more encrypted message blocks have been generated.

7. The encryption module of claim 1 wherein the processor is further configured to truncate the keystream when the text in the encrypted message block is less than a block length.

8. The encryption module of claim 7 wherein the processor is further configured to update the state value in the storage medium by applying a non-linear function to feedback with padding, the feedback including said at least a portion of the plaintext.

9. The encryption module of claim 8 wherein the processor is further configured to mask the keystream, the mask being generated by setting to zero bits corresponding to bits in the encrypted message block without text.

10. A decryption module, comprising: a storage medium configured to store a state value; and a processor configured to generate a keystream from the state value, and apply the keystream to an encrypted message block to convert ciphertext to plaintext, and wherein the processor is further configured to update the state value in the storage medium as a function of the plaintext.

11. The decryption module of claim 10 wherein the encrypted message block further includes plaintext, and wherein the processor is further configured to update the state value in the storage medium as a function of ciphertext generated from the plaintext in the encrypted message block.

12. The decryption module of claim 11 wherein the processor is further configured to apply a mask to the keystream, the masked keystream preventing the plaintext in the encrypted message block from being converted to ciphertext.

13. The decryption module of claim 10 wherein the processor is further configured to receive a plaintext message block with only plaintext, and update the state value in the storage medium as a function of ciphertext generated from the plaintext in the plaintext message block.

14. The decryption module of claim 13 wherein the processor is further configured to apply a mask to the keystream, the masked keystream preventing the plaintext in the plaintext message block from being converted to ciphertext.

15. The decryption module of claim 13 wherein the processor is further configured to receive a transmission block including one or more plaintext message blocks and one or more encrypted message blocks, and verify a message authentication tag attached to the transmission block.

16. The decryption module of claim 15 wherein the processor is further configured to verify the message authentication tag by generating an expected message authentication tag from the state value in the storage medium at some time after the keystream has been applied to the one or more plaintext message blocks and the one or more encrypted message blocks, and comparing the expected message authentication tag with the message authentication tag attached to the transmission block.

17. The decryption module of claim 10 wherein the processor is further configured to truncate the keystream when the text in the encrypted message block is less than a block length.

18. The decryption module of claim 17 wherein the processor is further configured to update the state value in the storage medium by applying a non-linear function to feedback with padding, the feedback including the plaintext.

19. The decryption module of claim 18 wherein the processor is further configured to mask the keystream, the mask being generated by setting to zero bits corresponding to bits in the encrypted message block without text.

20. A method of encryption, comprising: generating a keystream from a state value; applying the keystream to plaintext to generate an encrypted message block having at least a portion of the plaintext converted to ciphertext; and updating the state value in the storage medium as a function of said at least a portion of the plaintext.

21. The method of claim 20 wherein the plaintext includes a second portion, and the encrypted message block includes the ciphertext and the second portion of the plaintext, wherein the method further comprises updating the state value as a function of ciphertext generated from the second portion of the plaintext.

22. The method of claim 20 wherein the plaintext includes a second portion, and the encrypted message block includes the ciphertext and the second portion of the plaintext, and wherein the method further comprises masking the keystream, the masked keystream preventing the second portion of the plaintext from being converted to ciphertext.

23. The method of claim 20 further comprising generating a plaintext message block with only plaintext, and updating the state value in the storage medium as a function of ciphertext generated from the plaintext in the plaintext message block.

24. The method of claim 23 further comprising masking the keystream, the masked keystream preventing the plaintext in the plaintext message block from being converted to ciphertext.

25. The method of claim 24 further comprising generating a transmission block including the plaintext message block and the encrypted message block, and attaching a message authentication tag to the transmission block, and wherein the message authentication tag is generated from the state value in the storage medium at some time after the plaintext message block and the encrypted message block have been generated.

26. A method of decryption, comprising: generating a keystream from the state value; applying the keystream to an encrypted message block to convert ciphertext to plaintext; and updating the state value in the storage medium as a function of the plaintext.

27. The method of claim 26 wherein the encrypted message block further includes plaintext, and wherein the state value is updated as a function of ciphertext generated from the plaintext in the encrypted message block.

28. The method of claim 27 further comprising masking the keystream, the masked keystream preventing the plaintext in the encrypted message block from being converted to ciphertext.

29. The method of claim 26 further comprising receiving a plaintext message block with only plaintext, and wherein the state value is updated as a function of ciphertext generated from the plaintext in the plaintext message block.

30. The method of claim 29 further comprising masking the keystream, the masked keystream preventing the plaintext in the plaintext message block from being converted to ciphertext.

31. The method of claim 29 further comprising receiving a transmission block including the plaintext message block and the encrypted message block, and verifying a message authentication tag attached to the transmission block.

32. The method of claim 31 wherein the message authentication tag is verified by generating an expected message authentication tag from the state value in the storage medium at some time after the keystream has been applied to the plaintext message block and the encrypted message block, and comparing the expected message authentication tag with the message authentication tag attached to the transmission block.

33. Computer readable media embodying a program of instructions executable by a processor to perform a method of encryption, the method comprising: generating a keystream from a state value; applying the keystream to plaintext to generate an encrypted message block having at least a portion of the plaintext converted to ciphertext; and updating the state value in the storage medium as a function of said at least a portion of the plaintext.

34. The computer readable media of claim 33 wherein the plaintext includes a second portion, and the encrypted message block includes the ciphertext and the second portion of the plaintext, wherein the state value is updated as a function of ciphertext generated from the second portion of the plaintext.

35. The computer readable media of claim 33 wherein the plaintext includes a second portion, and the encrypted message block includes the ciphertext and the second portion of the plaintext, and wherein the method further comprises masking the keystream, the masked keystream preventing the second portion of the plaintext from being converted to ciphertext.

36. The computer readable media of claim 33 wherein the method further comprises generating a plaintext message block with only plaintext, and updating the state value in the storage medium as a function of ciphertext generated from the plaintext in the plaintext message block.

37. Computer readable media embodying a program of instructions executable by a processor to perform a method of decryption, the method comprising: generating a keystream from the state value; applying the keystream to an encrypted message block to convert ciphertext to plaintext; and updating the state value in the storage medium as a function of the plaintext.

38. The computer readable media of claim 37 wherein the encrypted message block further includes plaintext, and wherein the state value is updated as a function of ciphertext generated from the plaintext in the encrypted message block.

39. The computer readable media of claim 38 wherein the method further comprises masking the keystream, the masked keystream preventing the plaintext in the encrypted message block from being converted to ciphertext.

40. The computer readable media of claim 37 wherein the method further comprises receiving a plaintext message block with only plaintext, and wherein the state value is updated as a function of ciphertext generated from the plaintext in the plaintext message block.

41. An encryption module, comprising: means for generating a keystream from a state value; means for applying the keystream to plaintext to generate an encrypted message block having at least a portion of the plaintext converted to ciphertext; and means for updating the state value in the storage medium as a function of said at least a portion of the plaintext.

42. A decryption module, comprising: means for generating a keystream from the state value; means for applying the keystream to an encrypted message block to convert ciphertext to plaintext; and means for updating the state value in the storage medium as a function of the plaintext.

* * * * *

UNITED STATES PATENT AND TRADEMARK OFFICE
CERTIFICATE OF CORRECTION

PATENT NO. : 7,623,656 B2
APPLICATION NO. : 11/061708
DATED : November 24, 2009
INVENTOR(S) : Hawkes et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1161 days.

Signed and Sealed this

Fourteenth Day of December, 2010

David J. Kappos
*Director of the United States Patent and Trademark Office*